P. J. MADIGAN.
LIQUID DISTRIBUTING DEVICE.
APPLICATION FILED JUNE 21, 1913.
1,090,320.
Patented Mar. 17, 1914.
3 SHEETS—SHEET 1.
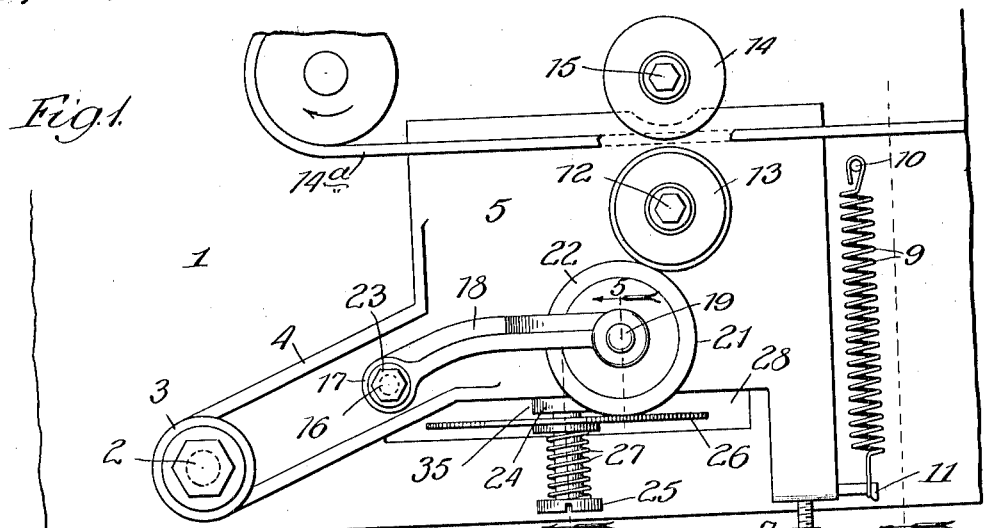
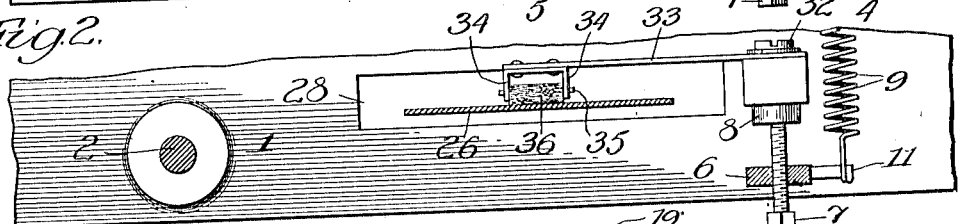
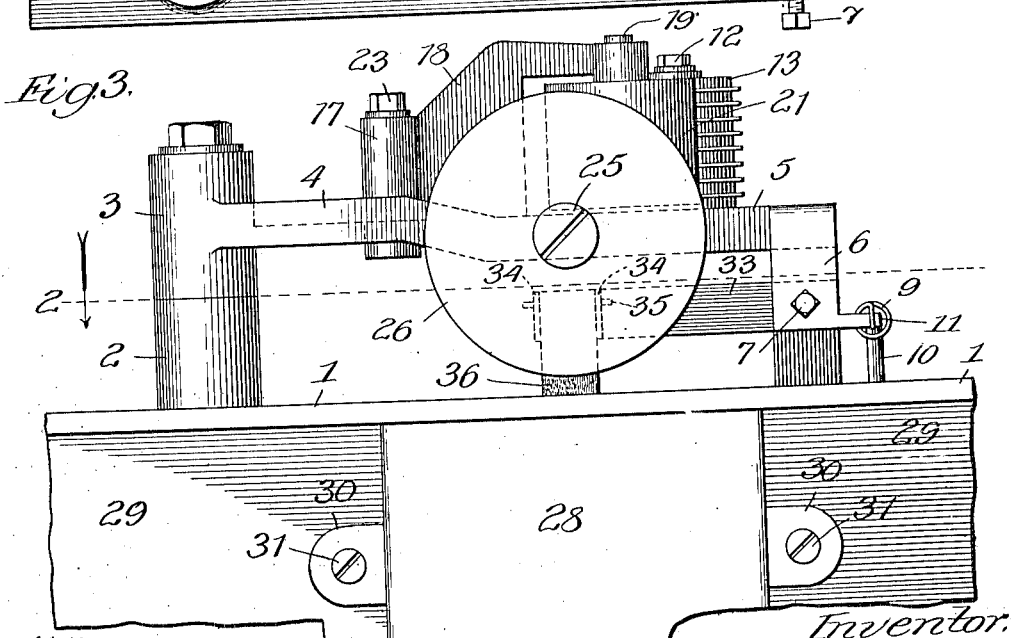
Witnesses:
Inventor:
Patrick J. Madigan.
By David H. Fletcher,
Att'y.

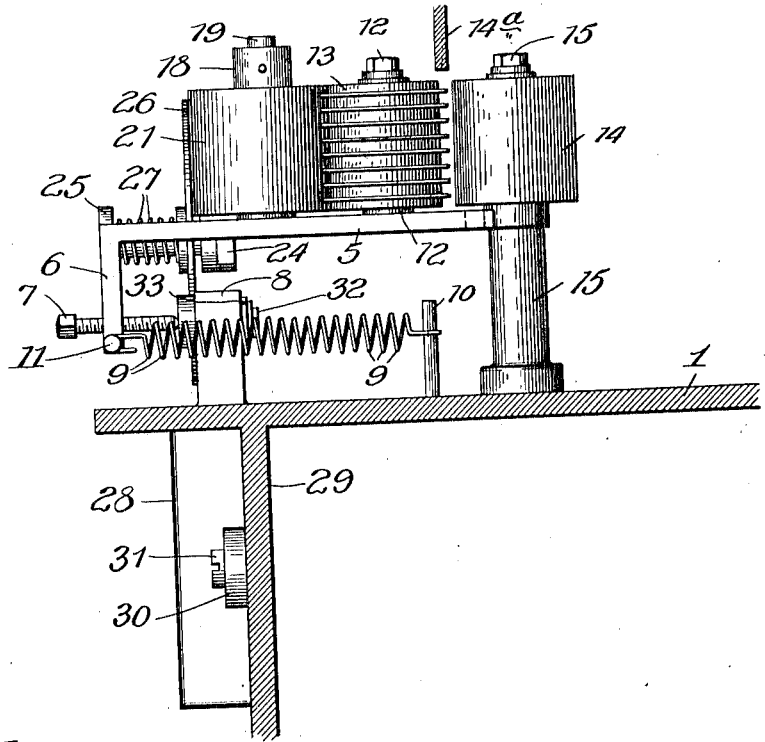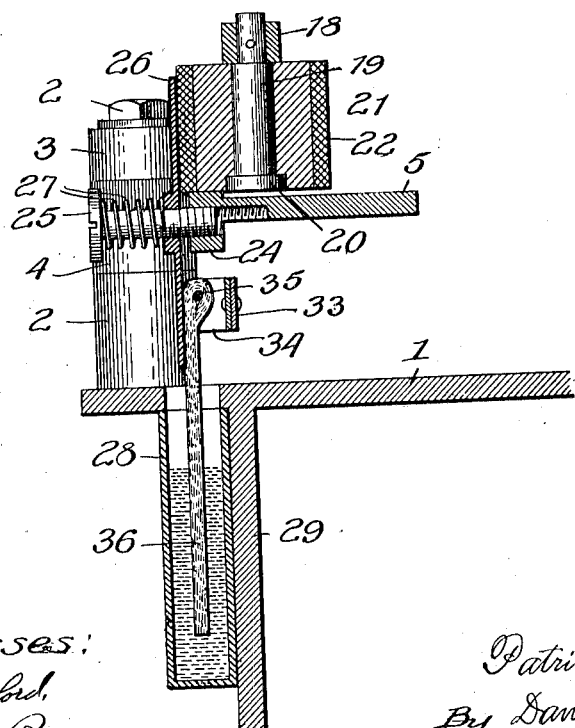

P. J. MADIGAN.
LIQUID DISTRIBUTING DEVICE.
APPLICATION FILED JUNE 21, 1913.

1,090,320.

Patented Mar. 17, 1914.
3 SHEETS—SHEET 3.

Witnesses:

Inventor:
Patrick J. Madigan,
By David H. Fletcher,
Atty.

UNITED STATES PATENT OFFICE.

PATRICK J. MADIGAN, OF CHICAGO, ILLINOIS.

LIQUID-DISTRIBUTING DEVICE.

1,090,320.  Specification of Letters Patent.  Patented Mar. 17, 1914.

Application filed June 21, 1913. Serial No. 775,051.

*To all whom it may concern:*

Be it known that I, PATRICK J. MADIGAN, a citizen of the United States, residing at Chicago, in the county of Cook and State of Illinois, have invented certain new and useful Improvements in Liquid-Distributing Devices, of which the following is a description, reference being had to the accompanying drawings, forming a part of this specification, in which corresponding letters of reference in the different figures indicate like parts.

The object of my invention is to provide a simple, cheap and effective device for automatically causing an even and uniform distribution of liquid or semi-liquid material, such, for example, as water, ink, paste or the like upon the surface or periphery of a roller or other movable member or thing for the purpose of making a further distribution upon a contacting surface such as a moistening roller, printing die or other similar element.

To this end, my invention consists in the combination of elements hereinafter more particularly described and definitely pointed out in the claims.

Figure 6:
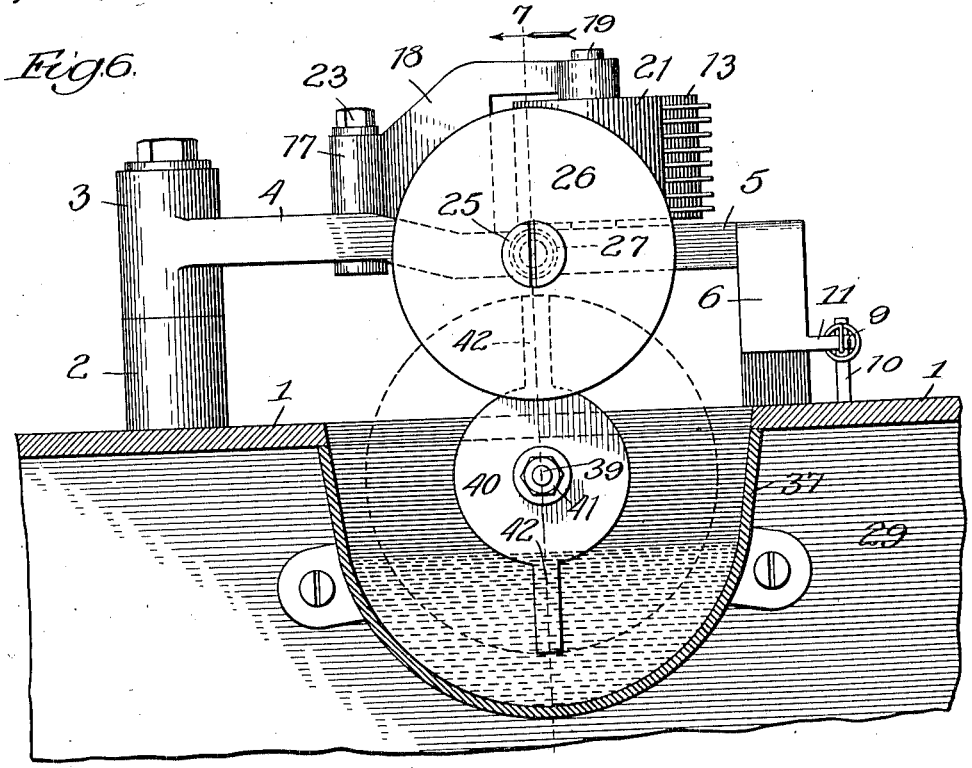
Figure 7:
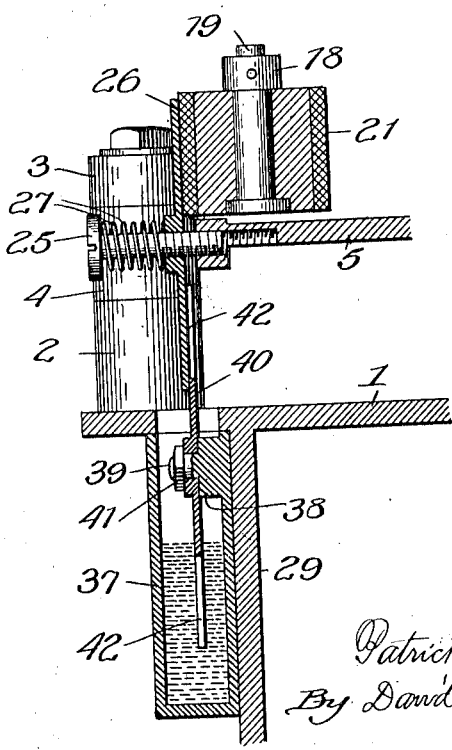

In the drawings, Figure 1, is a plan view of a device embodying the features of my invention as illustrated in an ink distributer, Fig. 2, is a sectional plan view of a portion of the device taken upon the line 2, Fig. 3, Fig. 3, is a side elevation showing an ink-well beneath the table, Fig. 4, is a vertical section taken upon the line 4, Fig. 1, viewed in the direction of the arrow there shown, Fig. 5, is a vertical section taken upon the line 5, Fig. 1, Fig. 6, is a vertical section through the ink-well represented in a modified construction, and Fig. 7, is a vertical section taken upon the line 7, Fig. 6, viewed in the direction of the arrow there shown.

Referring to the drawings, 1, indicates a supporting table or base to which is rigidly secured a vertical pivot-stud 2, having fitted thereon a sleeve 3, from which is extended an arm 4. Said arm is integral with, and serves as a support for a horizontal plate 5. A downwardly extended lug 6, Figs. 2, 3 and 4, is formed upon said plate and through it is tapped an adjusting screw 7 arranged to contact with a banking-stud 8, secured to the base. A coiled-spring 9, has one end secured to a pin 10, upon the base and the other to a pin or hook 11, upon the lug 6, which spring serves to hold the adjusting-screw against said banking-stud.

Mounted upon a vertical wrist-pin 12, attached to the plate 5, is a marking-die or roller 13, which is yieldingly held by the spring 9 in operative proximity to an impression roller 14, journaled upon a stud 15, attached to the frame. The articles to be marked, such, for example, as mail-pieces, may be passed in any well known way between the impression roller and the die, the spring 9, permitting a sufficient yielding movement to provide for the passage between the die and impression roller of articles of varying thickness.

Rigidly attached to the arm 4, is a stud 16, upon which is mounted a sleeve 17, from which is extended an arm 18, having a depending wrist-pin 19, rigidly attached to its outer end. Upon the lower end of said wrist-pin is formed a head 20, Fig. 5, and said pin has journaled thereon an ink-roller generally designated by 21, the periphery or acting surface 22, of which is formed from felt or other absorbent material. The arm 18, is adjusted to cause the periphery of said ink-roller to bear against that of the marking-die, whereupon the nut 23, upon the stud 16, may be tightened to hold the arm in place.

Tapped into a boss 24, formed upon the edge of the plate 5, is a horizontal screw 25, the body of which is caused to extend outwardly a considerable distance from said boss. Loosely journaled upon said screw body is a disk 26, preferably of metal, a portion of the face of which is held with a yielding pressure against the periphery of the ink-roller 21, by means of a coiled-spring 27, interposed between said disk and the head of said screw.

Located beneath the table directly below the disk, is an ink-well 28, which is attached to a vertical supporting plate 29, by means of lugs 30 and screws 31. Attached to the stud by means of a screw 32, is a flat spring 33, which is extended horizontally above the ink-well and is provided with lugs 34, upon its outer end through which is projected a pin 35. Suspended from said pin is a strip 36, of felt or other absorbent material, the lower portion of which is extended into the ink within the well in the manner more clearly shown in Fig. 5, while the upper part is pressed by said spring against that surface of said disk which contacts with the ink-roller.

As stated, the plate 5, is yieldingly held in a normal position by the spring 9, and tends thereby to press the marking-die against a passing letter or other article to be marked. Said die may be rotated either by the friction of such passing article, conveyed in a well known way by the usual feed-belt 14ª or otherwise, and when so rotated will cause the ink-roller 21, to be actuated, which in turn, serves to rotate the disk 26. The upper end of the absorbent strip being pressed by the spring 33, against the face of the disk, acts to distribute a film of ink upon the latter, which ink is drawn up by capillary action from the well. The film of ink which is evenly distributed upon the disk, is transferred to the ink-roller 21, and thence to the marking-die. The spring 27, serves to press the disk against the ink-roller, thereby insuring a continuous contact between them, while a similar result is accomplished by the spring 33, in pressing the inking-strip 36 against said disk in opposition to the action of the spring 27.

In Figs. 6 and 7 I have shown a modified means for elevating the ink to the distributing disk. The ink-well 37, bears the same relation to the disk but is somewhat modified in shape and has formed upon one of its inner faces a boss 38, with a stud or wrist-pin 39, upon which is journaled a disk 40, held in place by a nut 41. The disk 40, is caused to slightly overlap the periphery of the disk 26, and is provided with one or more arms 42, of sufficient length to dip into the ink when the disk 40 is rotated and to distribute it over the face of the disk 26. The frictional contact of the disk 26, pressed by the spring 27, serves to rotate the disk 40.

Having thus described my invention, what I claim and desire to secure by Letters Patent is:

1. An inking device comprising an ink container, a rotary disk mounted upon a substantially horizontal axis, an absorbent member having its lower end arranged to extend into an ink supply in said container, a spring for pressing the upper portion thereof against the face of said disk, a distributing roller having a substantially vertical axis, the periphery of said roller being in frictional contact with the face of said disk, a rotary printing member having its periphery in contact with that of said distributing roller and means for rotating said printing member.

2. A device of the character specified, comprising a rotary marking die, an ink roller in frictional contact therewith, a disk mounted upon an axis at right angles to that of said roller, means for yieldingly pressing one face of said disk against the periphery of said ink-roller, an ink-well and means for conveying ink therefrom to the face of said disk.

3. A device of the character specified, comprising a rotary marking die, an ink-roller in operative contact therewith, a disk journaled upon an axis at right angles to that of said roller, means for yieldingly pressing one face of said disk against the periphery of said ink-roller, an ink-reservoir, an absorbent member arranged to extend into the ink within said reservoir and means for yieldingly pressing the upper part of said absorbent member into contact with the distributing face of said disk.

4. A device of the character specified, comprising a rotary marking die, an ink roller in peripheral contact therewith, said die and roller being mounted upon vertical axes, a disk mounted upon a horizontal axis, said disk having one face in contact with the periphery of said ink-roller, a spring for pressing said disk against said roller, an ink-reservoir, an absorbent member suspended to contact with the ink therein and means for yieldingly holding the upper portion of said absorbent member in contact with that face of said disk which is adapted to engage with said ink-roller.

In testimony whereof, I have signed this specification in the presence of two subscribing witnesses, this nineteenth day of June, 1913.

PATRICK J. MADIGAN.

Witnesses:
DAVID H. FLETCHER,
LEONARD W. NOVANDER.